April 23, 1957 M. BONNAFFOUS 2,790,038

TELEPHONE EAR-PIECE

Filed Oct. 28, 1953 3 Sheets-Sheet 1

April 23, 1957 M. BONNAFFOUS 2,790,038

TELEPHONE EAR-PIECE

Filed Oct. 28, 1953 3 Sheets-Sheet 2

United States Patent Office 2,790,038

Patented Apr. 23, 1957

2,790,038

TELEPHONE EAR-PIECE

Maurice Bonnaffous, Paris, France, assignor to Socapex-Ponsot, Verdun Suresnes, France, a corporation of France Application October 28, 1953, Serial No. 388,739

Claims priority, application France February 27, 1953

2 Claims. (Cl. 179—182)

The present invention relates to ear-pieces, and namely types which are suitable for earphones.

An ear-piece of this kind may, moreover, be utilized in any ear-protecting device, as regards shocks and/or noise, and associated, or not, with a telephone receiver, such as that in headphones, helmets, headbands, etc.

One of the objects of the invention is to provide an ear-protecting device for isolating completely the user from all external noise.

Another object of the invention is to provide a device of the above type adaptable to the various parts of the face, neck, or head, with which it is called upon to cooperate.

Thus, in this respect, it is also an object of the invention to provide such a device which will be practically impervious to air.

A further object of the invention is to provide an ear-protecting device which will not impose any uncomfortable constraint upon the user, and this especially as regards the earphone cap.

It is still another object of the invention to provide such a device which will not hinder in any manner the movements of the user, the latter having an absolute liberty of movement for accomplishing his various duties without any extra fatigue.

The invention also provides a device, which, associated with a telephone receiver, will permit adjusting the latter into the most favourable position as regards speaking.

Another object of the invention is to provide a device which will be automatically adapted to the various pressure conditions of the surrounding media.

A still further object of the invention is to provide such a device which will be quickly and easily adaptable to the different features or cranial structures of the users.

The invention has also for its object a device which, in addition to its anti-noise properties, is also characterized by remarkable anti-shock features.

In a general manner, the invention aims to provide a device which will be used with advantage in aircraft equipment.

It is also an object of the invention to provide an ear-piece which will permit a simple, quick, and accurate adjustment of the telephone granule cup, or capsule, into its correct position.

Another object of the invention aims to provide such an ear-piece which will, simultaneously, and for all the capsule adjusting positions, be adapted as best as possible, by means of the earphone cap, to the user's cranial structure.

Still another object of the invention is to provide an ear-piece which, for all capsule settings, will isolate the mastoidean cavity effectively, respectively from external sound.

Thus, an object of the invention is to provide an ear-piece which will simultaneously take into account the osseous structure of the user and the location of his auditory duct respectively in his skull.

The ear-piece according to the invention comprises a rigid external case, made of hard rubber for instance, constituting the earphone capsule support, on which is adapted a cap or cup, made of sponge rubber or the like, having a peripheral rim joined to the cap by a thinned or tapered part about which it pivots.

The cap is advantageously shaped so that the rim will press against and cover the angle formed by the lower jaw and the mastoid process, isolating thus effectively this part of the skull and rendering it impervious to sound.

According to one preferred form of embodiment, the ear-piece rigid case is adjustably mounted in a recess so that it will be more easily adapted to the user's configuration.

Regarding adjusting means, the invention provides for wedges interposed between the case and the recess walls, or a plurality of fixing points between the said case and the recess walls, such as snap-buttons for instance, selectable for adjustment, or, further, an eccentric mounting.

According to the invention, the ear-piece includes a telephone capsule support eccentrically mounted respectively on a support permanently fitted onto the head, such as a helmet or headband for instance, an ear-protector or headphone armature, so that it may be quickly adjusted, through rotation, into position with respect to the auditory duct, and, moreover, an isolating cap applied against the ear, made of sponge rubber or the like, and the shape of which, unlike the conventional circular disk shape usually adopted, is designed so that it will match the ear contour and the structure of the adjacent parts of the head, and also rotatably mounted, in order that it may be adjusted to the best position on the head for any setting of the telephone capsule.

The following specification, giving some non-limitative examples, refers to the appended drawing in which.

Figure 1:
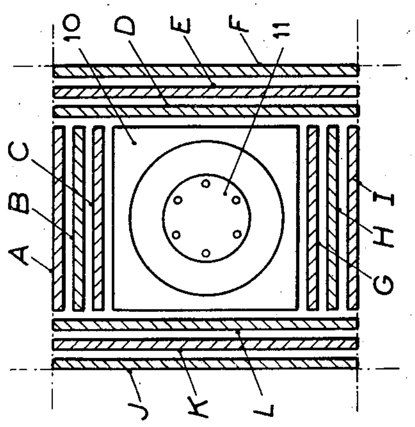
Fig. 1 is a schematic front view of one embodiment of the invention.

Referring first to Fig. 1, the earphone case 10, made of hard rubber or the like, is mounted in its recess with the interposition of a plurality of wedges A—F. In the position illustrated on the figure, the capsule occupies the center of the recess. If, to suit a user's cranial structure, it becomes necessary to move the capsule, upwards for instance, the wedge A is removed and placed back below the wedge I. A lateral adjustment will similarly be obtained by removing the wedge J and placing it on the right of the wedge F.

Figure 2:
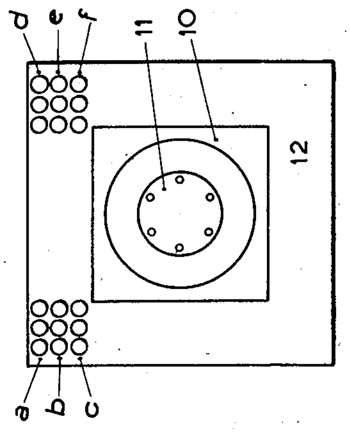
Fig. 2 shows a similar view of a modification.

In the embodiment shown in Figure 2, the case 10 has been moulded integral with a strong piece of canvas 12; the latter is provided with snap-button elements, as shown at *a*, *b*, *c*, *d*, *e*, *f*, *g*, and *h*, cooperating with conjugated snap-button elements of the support for the vertical and lateral adjustment of the ear-piece.

Figure 3:
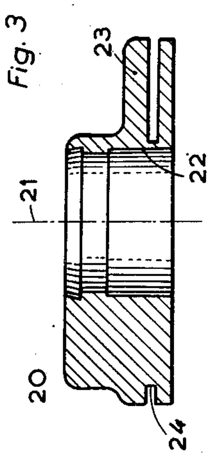
Fig. 3 is a cross-section of another embodiment.
Figure 4:
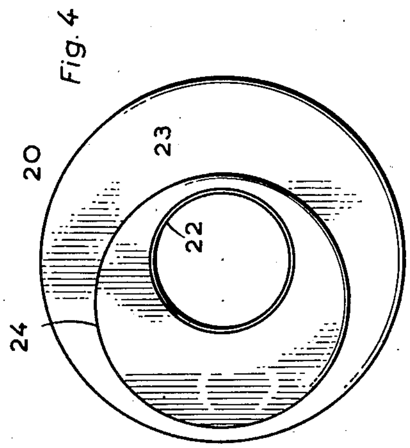
Fig. 4 is a corresponding plane view.

In the embodiment illustrated in Figures 3 and 4, the case 20 is substantially cylindrical in shape, but it is off-centered from the axis 21 of the recess 22 accommodating the earphone capsule. The case base 23 has a groove 24 the bottom of which has a contour eccentric to the said axis 21, so that, if the case 20 is rotated on a support provided with a rib conjugated with the said groove, the axis 21 will be displaced, and, consequently the earphone setting may be adjusted opposite the auditory meatus. Simultaneously, this rotary movement permits the approach of the earphone nearer to the said auditory meatus.

Figure 5:
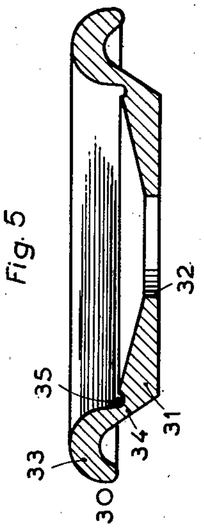
Fig. 5 is the cross-section of a cap.
Figure 6:
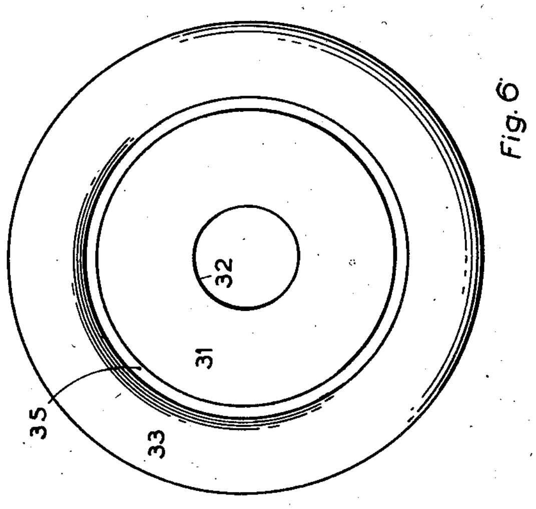
Fig. 6 is a corresponding plane view.
Figure 11:
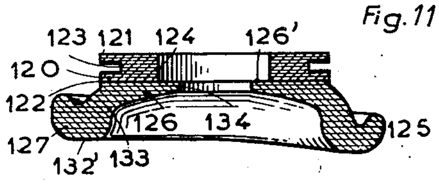
Fig. 11 shows a cross-section of a cap and of a support.
Figure 9:
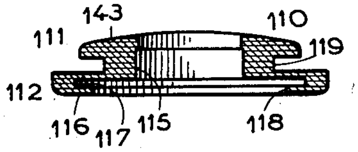
Fig. 9 is a cross-section of an earphone support.
Figure 12:
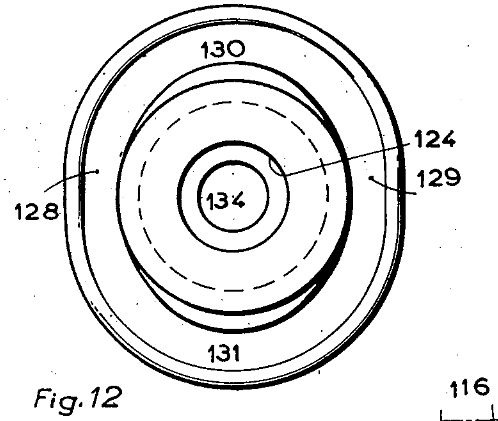
Fig. 12 is an elevated rear view of the same.
Figure 10:
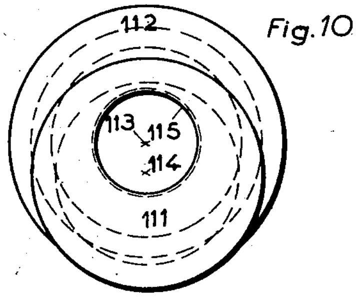
Fig. 10 represents a front view of the same.

Figures 5 and 6 relate to one form of the sponge rubber cap for an ear-protector case. This cap 30 comprises a bottom attaching part 31, with a bore 32 forming a channel for the sounds arriving from the earphone capsule. The bottom part 31 is bordered by a peripheral rim 33, a groove 35 on the internal face of the said cap tapering toward the joining part 34, so that the rim 33 will pivot on the bottom part 31 and so that the rim will be adapted, in an airtight manner, owing to its flexibility, against the adjacent parts of the head or face, notwithstanding their irregular shape.

Figure 7:
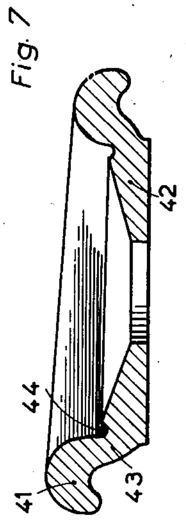
Fig. 7 is a cross-section of a cap in a modification.
Figure 8:
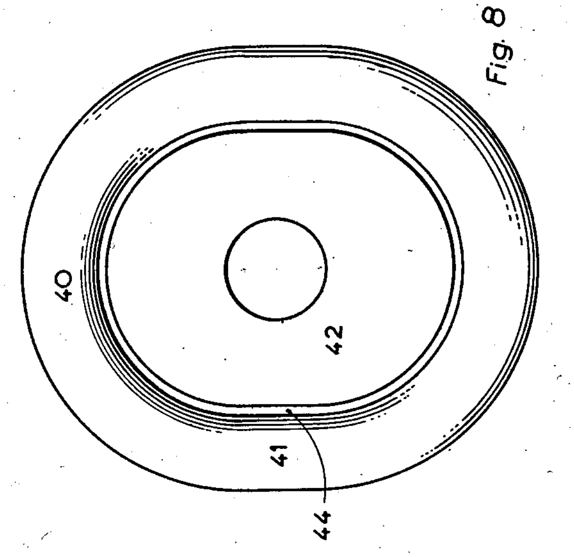
Fig. 8 is a corresponding plane view.

Refering now to Figures 7 and 8, the cap is higher on one side than on the other, so that the rim will fit, by its rear part 41, over the angle formed by the lower jaw and the mastoid process. The rim 40 is joined to the bottom 42 by a joining part 43 tapered by a groove 44.

Turning now to Figures 9 to 13, the case 10 is made of soft rubber or the like. It is constituted by juxtaposing two circular disks 111 and 112, the axes of which are different, the axis of disk 112 being shown at 113 and that of disk 111 at 114. The said case is traversed by a cylindrical channel 115, the axis of the latter being substantially common with axis 113. The disk 112 has a thin part 116 folded back so as to form a circular groove, the outer periphery of the folded part 116 delimiting an orifice 118.

The case 120 is constituted by a rigid cylindrical ring, made of Bakelite for instance, or the like, constituted by the juxtaposition of two disks 121 and 122 separated by a part showing a smaller diameter forming a groove 123. The disk 121 is circular in shape, whereas the shape of disk 122 is oblong, oval or elliptical for instance, the smaller diameter of the ellipse or the like being substantially equal to the diameter of disk 121. The case 120 comprises a central orifice 124, the diameter of the latter being substantially equal to that of the channel 115.

A cap 125, made of foam rubber or like flexible material, is fixed on the case 120, by gluing for instance, and comprises a base 126. The external face 126' of the latter is plane, as shown in 126, in order to be effectively glued to the case, and a peripheral rim 127 substantially oblong in shape is provided with substantially linear parts 128 and 129 joined by substantially circular parts 130 and 131. The rim 127 shows a convex side 132 with a flat 132' in view to increase the operative surface on the head and to improve the isolation of the ear towards external sounds. The part 133 joining it to the base 126 is relatively thinner. A bore 134 is provided through the cap, co-axially with the orifice shown in 124.

The rear part of the cap 125 is higher than its front part (see on right of Figure 11), so that it will isolate as much as possible the mastoidean cavity which is particularly sensitive to sound by permeability; the thickness of the rim, at the rear part, is as a whole slightly greater than that of the front part in order that it may be better adapted to the osseous structure of the posterior part of the ear.

Figure 13:
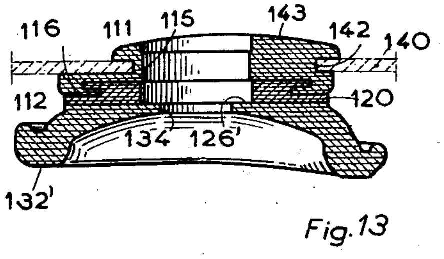
Fig. 13 is a cross-section showing an earphone support and cap assembly.
Figure 14:
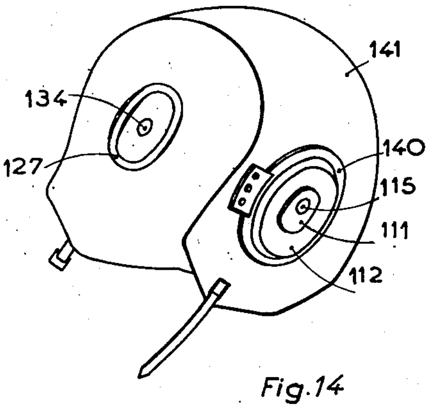
Fig. 14 is a schematic perspective view of a helmet fitted with two earphones according to the invention.

Figure 13 shows the case 110 assembled with the cap-support 120 and the cap 125. This assembling in performed by introducing the peripheral rib of the disk 121 into the groove 117, this being rendered easier by the flexibility of the folded part 116 constituting the said groove. This assembly will permit a relative rotary motion of the case 110 on the one hand and of the cap-support-cap 120—125 on the other.

The ear-piece constituted by the assembly defined above is mounted in or on any suitable support, helmet, ear-protector, skull cap, headphones, etc., by means of the circular groove 119 on either side of which are provided disks 111 and 112. This groove is centered on the axis 114. The said assembly may be mounted for instance on the leather garnishing 140 of a helmet 141 provided with a circular orifice 142.

When the ear-piece assembly is rotated about its support, such as the garnishing 140 for instance, by turning the cap 125, the axis of the passage constituted by the channel 115, the duct 124 and the orifice 134, will have a position varying respectively to the garnishing 140, and consequently to the ear and to the auditory duct, owing to the interval between the axis 113 of the said duct and the axis 114 of the guiding orifice 142. This rotary motion is continued until the telephone capsule, which is entrained by the movement since it is housed in the channel 115—124, is as near as possible to the auditory duct meatus. This obtained, the cap 125, if necessary, is brought to a position where it will offer the best protection to the ear against external noise, the rear part of the rim, that is the higher part isolating the mastoid recess, adapting itself to the configuration of the user's head, and this by rotating the said cap, while, at the same time, holding by a slight pressure of the hand on the external face 143 of the disk 111, which is advantageously domed permitting thus a relative displacement of the cap and cap-support on one hand, and of the case 110 on the other hand, so that, without altering the position of the telephone capsule housed in the case 110, corresponding to an optimum setting, the cap 125 may be adjusted in the desired position.

What I claim is:

1. A telephone head-set comprising a head harness, means defining an aperture in the harness corresponding to the user's ear when in use, an annular body rotatably mounted in said aperture and comprising circular support means positioned eccentrically with respect to said aperture, and an oblong ear-piece rotatably mounted on said support.

2. A telephone head-set as in claim 1 wherein the ear-piece comprises an outer rim, an inner base and a junction piece connecting the base and rim and of substantially thinner construction.

References Cited in the file of this patent

UNITED STATES PATENTS

| | | |
|---|---|---|
| 1,368,261 | Jenkins | Feb. 15, 1921 |
| 1,368,307 | Waldron | Feb. 15, 1921 |
| 1,586,140 | Bonnette | May 25, 1926 |
| 2,407,731 | Woodruff | Sept. 17, 1946 |
| 2,603,724 | Kettler | July 15, 1952 |